United States Patent
Hrovat

[19]

[11] Patent Number: 6,009,967
[45] Date of Patent: *Jan. 4, 2000

[54] METHOD AND SYSTEM FOR COORDINATED ENGINE AND TRANSMISSION CONTROL DURING TRACTION CONTROL INTERVENTION

[75] Inventor: Davorin David Hrovat, Dearborn, Mich.

[73] Assignee: Ford Global Technologies, Inc., Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/784,216

[22] Filed: Jan. 16, 1997

[51] Int. Cl.[7] ............................................. B60K 3/06
[52] U.S. Cl. ................................................. 180/197
[58] Field of Search ........................ 180/197; 701/82, 701/87, 88, 90, 91

[56] References Cited

U.S. PATENT DOCUMENTS

| | | |
|---|---|---|
| 4,955,449 | 9/1990 | Hilburger ............................ 180/197 |
| 5,586,953 | 12/1996 | Abo . |
| 5,813,936 | 9/1998 | Kichima . |
| 5,850,887 | 12/1998 | Nakashima ......................... 180/197 |
| 5,921,889 | 7/1999 | Nozaki . |

*Primary Examiner*—Chris Schwartz
*Assistant Examiner*—C. T. Bartz
*Attorney, Agent, or Firm*—Frank G. McKenzie; Roger L. May

[57] ABSTRACT

A coordinated engine and transmission traction control method is disclosed for reducing driven wheel speed transients related to transmission shifting during a traction control event. The method includes sensing a driven wheel speed, and estimating a driving surface coefficient of friction based on the sensed wheel speed. The method also includes prolonging a transmission upshift by reducing a rate of change of a commanded speed ratio in proportion to the estimated driving surface coefficient of friction, and decreasing engine torque during the transmission upshift. A system including a wheel speed sensor and control logic is also disclosed for performing the method.

18 Claims, 3 Drawing Sheets

METHOD AND SYSTEM FOR COORDINATED ENGINE AND TRANSMISSION CONTROL DURING TRACTION CONTROL INTERVENTION

TECHNICAL FIELD

This invention relates to a coordinated engine and transmission traction control method and system for reducing driven wheel speed transients related to transmission shifting during a traction control event.

BACKGROUND ART

It is increasingly common for automotive vehicles to be equipped with traction control systems. Such systems are designed to control the speed of a driven wheel to a desired level in order to improve vehicle stability, particularly on driving surfaces having low coefficients of friction.

More specifically, an imbalance between engine torque and road torque acting on a vehicle wheel can cause the wheel speed to exceed the desired level, which is typically referred to as wheel spin. To control such wheel spin, traction control systems generally employ engine or brake management to control the engine torque acting on the wheel.

In automatic transmission vehicles, while operating in a traction control mode, shifting of the automatic transmission powertrain can also contribute to such torque imbalances. Indeed, such shifting can cause sudden and significant disturbances in driven wheel speeds. In turn, such shift-created wheel speed transients can momentarily reduce vehicle stability.

As a result, there is a need for an improved traction control method and system that reduces driven wheel speed transients related to transmission shifting during a traction control event. Such a method and system would reduce such transients using coordinated engine and transmission control.

SUMMARY OF THE INVENTION

Accordingly, it is the principle object of the present invention to provide an improved traction control method and system using coordinated engine and transmission control to reduce driven wheel speed transients related to transmission shifting during a traction control event.

According to the present invention, then, a coordinated engine and transmission traction control method is provided for reducing driven wheel speed transients related to transmission shifting during a traction control event. The method comprises sensing a driven wheel speed, and estimating a driving surface coefficient of friction based on the sensed wheel speed. The method further comprises prolonging a transmission upshift by reducing a rate of change of a commanded speed ratio in proportion to the estimated driving surface coefficient of friction, and decreasing engine torque during the transmission upshift.

A coordinated engine and transmission traction control system for reducing driven wheel speed transients related to transmission shifting during a traction control event is also provided. The system comprises a wheel speed sensor for sensing a driven wheel speed. The system further comprises control logic operative to estimate a driving surface coefficient of friction based on the sensed wheel speed, prolong a transmission upshift by reducing a rate of change of a commanded speed ratio in proportion to the estimated driving surface coefficient of friction, and decrease engine torque during the transmission upshift.

These and other objects, features and advantages will be readily apparent upon consideration of the following detailed description of the invention in conjunction with the accompanying drawings.

DETAILED DESCRIPTION OF THE INVENTION

In general, on slippery driving surfaces where traction control intervention is required, the method and system of the present invention employ an altered transmission control and a coordinated transmission and engine control. In so doing, the traction control method and system of the present invention significantly reduce shift-induced wheel speed disturbances on slippery surfaces, thereby improving vehicle stability, especially in turns.

Referring to FIGS. 1–5, the preferred embodiment of the present invention will now be described in greater detail. In that regard, FIG. 1a illustrates driven and non-driven vehicle wheel speeds (in RPMs) over time on a driving surface having a low coefficient of friction ($\mu$) according to prior art traction control methods and systems.

More specifically, a driven (front) wheel speed (10), a non-driven (rear) wheel speed (12), and a desired driven wheel speed (14) are shown for a vehicle equipped with an engine-only (electronic throttle and spark) traction control system during a straight ahead winter test from zero to 200 yards on polished ice.

As previously discussed, when operating in a traction control mode, an automatic transmission powertrain can act as a significant and sudden disturbance to a driven wheel speed due to shift-created transients. In that regard, as seen in FIG. 1, between approximately three to 16 seconds into the test, the vehicle is in first gear and the driven wheel speed (10) follows the desired driven wheel speed (14) in a slip-controlled traction control event.

However, at approximately 16 to 17 seconds into the test, the vehicle goes through the first to second gear upshift while in traction control mode. Due to the inertia phase loading of the first to second gear power-on upshift, the increased wheel torque causes a sudden spin of driven wheel (10) in the amount of 100 rpm or more. Such a sudden increase in driven wheel (10) in turn leads to NVH (Noise vibration, Harshness) transients and momentary loss of directional control.

Figure 1A:
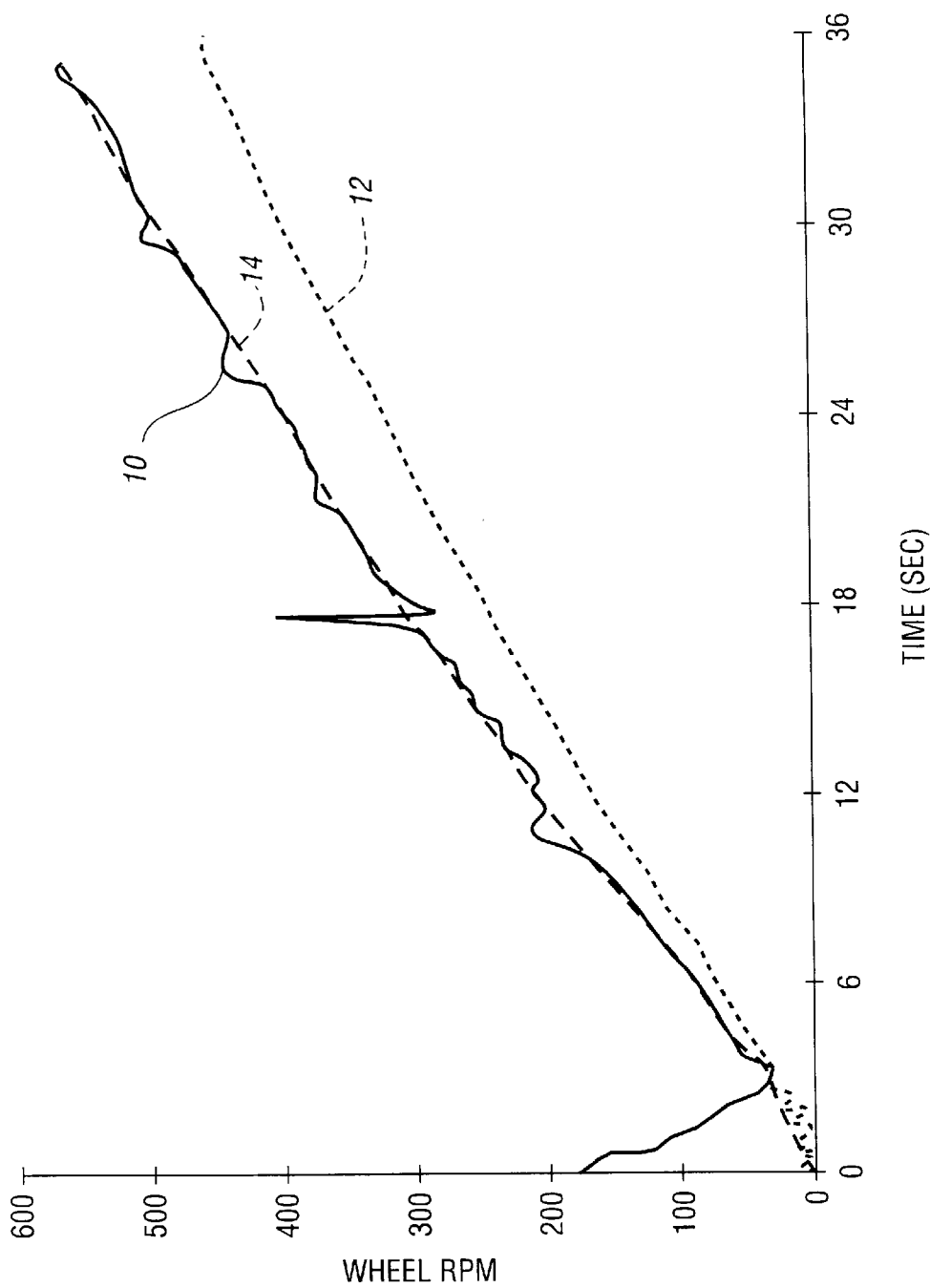
FIG. 1a is a graph of driven and non-driven vehicle wheel speeds over time on a driving surface having a low coefficient of friction according to prior art traction control methods and systems.
Figure 1B:
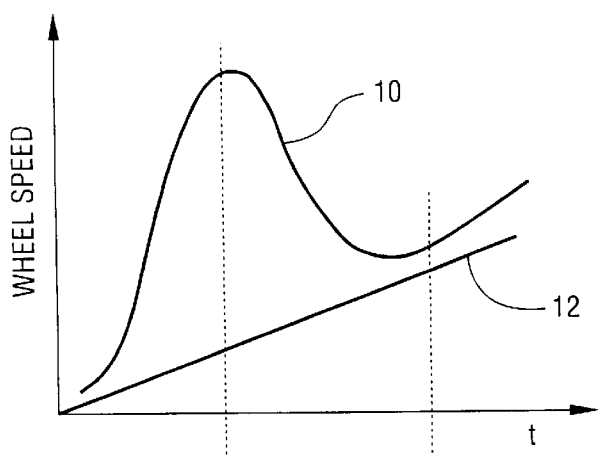
FIGS. 1b and 1c are graphs of driven and non-driven vehicle wheel speeds over time in relation to vehicle gear shifting according to prior art traction control methods and systems.
Figure 1C:
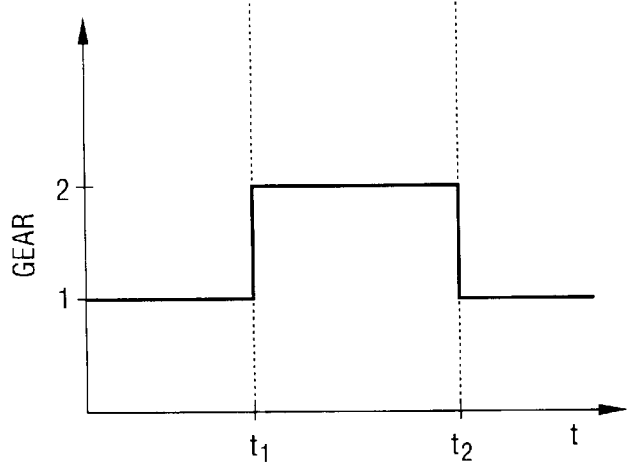

Referring now to FIGS. 1b and 1c, driven and non-driven vehicle wheel speeds are illustrated over time in relation to vehicle gear shifting according to prior art traction control methods and systems. As seen therein, when operating on slippery surfaces such as ice or snow, traction control equipped vehicles will exhibit a first spin characteristic where the driven wheel speed average (10) increases significantly faster than the nondriven wheel speed average (12).

At present, transmission shift schedules are often established as curves which are a function of throttle angle position versus vehicle speed. Significantly, vehicle speed is measured at the driven wheels. As a result, it is often possible that a relatively high driven wheel speed average, such as that which occurs during wheel spin, may induce a transmission upshift. This is depicted in FIG. 1b and 1c at time $t_1$. It is also possible that once the initial spin has been contained, a transmission downshift to the original gear may occur as depicted in FIG. 1b and 1c at time $t_2$.

To avoid such unnecessary shifting, which can be detrimental to drivetrain/transmission durability as well as vehicle stability/performance on slippery surfaces such as ice or snow, the method and system of the present invention use true vehicle speed for shift scheduling rather than the driven wheel speed average or transmission output speed, which is described in greater detail below. The true vehicle speed may be provided as an average of the non-driven wheel speeds in the case of two-wheel drive vehicles equipped with at least two or three channel anti-lock brake systems (ABS). In that case, the ABS wheel speed sensors can be used to accomplish this task.

In vehicles without ABS, true vehicle speed can be synthesized/approximated using the transmission output speed sensor (OSS). The OSS signal should be heavily filtered with a low-pass filter having a bandwidth of 0.5–1.0 Hz or lower. This will substantially reduce the first spin magnitude and thus prevent the unnecessary upshift trigger. This could be augmented by limiting the slope of the wheel speed traces to below the maximum slope physically possible prior to low-pass filtering.

An alternative methodology for determining true vehicle speed in vehicles without ABS could be based on wheel torque estimation as disclosed in U.S. Pat. No. 5,452,207, which is hereby incorporated by reference. A vehicle model based on such methodology would be initialized with a vehicle speed, road grade, and air resistance just before the onset of wheel spin.

Additionally, the above approaches could be combined via fuzzy logic to result in an effective true vehicle speed estimate for use in the altered shift scheduling of the method and system of the present invention. Still further, in four-wheel drive or ABS vehicles with acceleration-based speed signal reconstruction, the same acceleration sensor could be used for true vehicle speed estimation.

To prevent the wheel speed disturbance effects described above, the method and system of the present invention employ an altered automatic transmission control strategy during traction control mode. In that regard, the method and system of the present invention are designed for use with an electronically-controlled transmission well known in the art having appropriate actuators.

The first alteration to the automatic transmission control strategy pertains to the shift scheduling during traction control mode. Here, the method and system of the present invention use the effective throttle angle in the case of seriesthrottle actuator. More particularly, effective throttle angle may be calculated based on corresponding effective flows, as described in U.S. Pat. No. 5,520,146 which is hereby incorporated by reference.

Moreover, upshift during the first driven wheel spin can cause especially problematic wheel speed transients when operating in a traction control mode. As a result, the method and system of the present invention also delay a requested upshift until after driven wheel spin is first exhibited during traction control. In the case where no upshift has yet been requested, the method and system of the present invention command or introduce an upshift after driven wheel spin is first exhibited during traction control.

Figure 2:
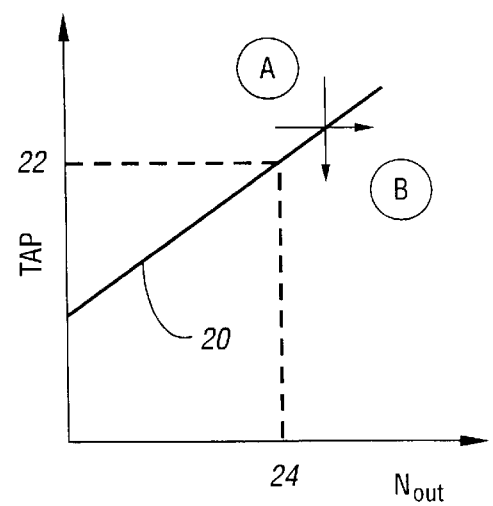
FIG. 2 is a graph illustrating automatic transmission gear shifting in relation to throttle angle position and transmission output speed.

More specifically, referring now to FIG. 2, automatic transmission gear shifting is illustrated in relation to throttle angle position (TAP) and transmission output speed ($N_{out}$) (in RPMs). As seen therein, shift curve (20) shows the TAP (22) or $N_{out}$ (24) at which a shift will be commanded between a lower gear (A) and a higher gear (B) for a given $N_{out}$ (24) or TAP (22), respectively. It should be noted that shift curve (20) is exemplary only, and may differ from vehicle to vehicle. It should also be noted that the above discussion concerning shift scheduling as a function of throttle angle position versus vehicle speed would result in a similar curve to that depicted in FIG. 2, where transmission output speed $N_{out}$ would be replaced by vehicle speed as represented by the driven wheel speed average.

Referring now to FIGS. 1a and 2, during traction control intervention, if the TAP and $N_{out}$ are such that a gear shift is commanded at the time driven wheel spin is first exhibited, transmission control is altered to delay such a shift to a later time when such wheel spin has been contained. Alternatively, if the TAP and $N_{out}$ are such that a gear shift has not yet been commanded at the time driven wheel spin is first exhibited, transmission control is altered to introduce such a shift shortly after that time, again when such wheel spin has been contained. In either fashion, the method and system of the present invention significantly reduce shift-induced wheel speed disturbances on slippery surfaces, thereby improving vehicle stability.

Moreover, shift scheduling may also be changed if an upshift is still encountered during the first exhibited wheel spin. In that case, such an upshift can be prevented by changing the shift (new gear) command to be equal to the present gear when wheel spin is detected To still further prevent the large upshift-created transients depicted in FIG. 1a, the method and system of the present invention also coordinate transmission and engine control. More specifically, once in a traction control operating mode, an upshift is prolonged through more gradual oncoming clutch (or band) element pressure application, which should be appropriately reduced.

Figure 3:
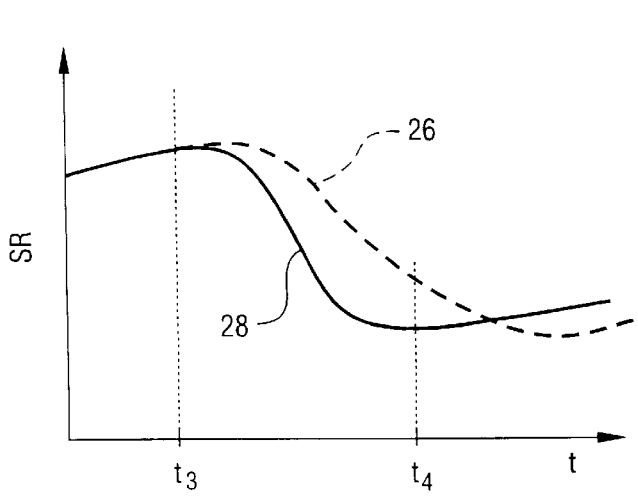
FIG. 3 is a graph comparing speed ratios over time according to prior art traction control methods and systems and the traction control method and system of the present invention.

In the case of closed-loop speed ratio control, a prolonged upshift can be achieved by commanding a less steep speed ratio (SR), which is defined as in automatic transmission vehicles as transmission output speed ($N_{out}$) (in RPMs) divided into turbine speed ($N_t$) (in RPMs). In that regard, FIG. 3 illustrates SR over time for power-on shifting according to prior art traction control methods and systems and the traction control method and system of the present invention. As seen therein, the traction control method and system of the present invention command a SR (26) having a reduced rate of change over time as compared to the commanded rate of change of SR (28) of prior art methods and systems. In such a fashion, the method and system of the present invention achieve a prolonged upshift, especially the inertial phase of the upshift between time $t_3$ and time $t_4$. It should be noted that prolongation of the transmission upshift during the inertial phase should take into account clutch thermal effects to prevent clutch damage.

The reduction in the slope of the curve of speed ratio (26) commanded by the method and system of the present invention is a function of the coefficient of friction ($\mu$) of the driving surface, which may be estimated in any known fashion. In that regard, the slope of SR curve (26) is reduced as $\mu$ decreases.

More particularly, the limiting torque at the wheel ($t_{lim}$) which the driving surface can sustain is a function of the estimated $\mu$ of the driving surface. Such limiting torque must be greater than the actual torque at the wheel ($t_w$). This relationship is represented by the following constraint equation:

$$t_w < t_{lim}(\mu_{est}) \qquad (1)$$

In that regard, $t_w$ may be represented as follows:

$$t_w = SR_{ng} * f_{tc}(SR_{tc}, (t_e + I_e a_e)) * FDR/2 * e_{\mathit{eff}} \qquad (2)$$

where $SR_{ng}$ is the speed ratio of the next gear; $f_{tc}$ is a torque conversion function based on the speed ratio of the torque convertor $SR_{tc}$, engine torque $t_e$, engine inertia $I_e$, and engine acceleration $a_e$; FDR is the final drive ratio; and $e_{\mathit{eff}}$ represents transmission efficiency and includes those factors lowering torque delivered at the wheel. In that regard, $e_{\mathit{eff}}$ is less than one (approximately 0.9).

As is well known in the art, the slope of the curve of SR (26) is related to engine acceleration ($a_e$) through a torque conversion function. Thus, according to the method and system of the present invention, the rate of change of SR (26) over time is reduced according to the following constraint equation:

$$SR_{ng} * f_{tc}(SR_{tc}, (t_e + I_e a_e)) * FDR/2 * e_{\mathit{eff}} < t_{lim}(\mu_{est}) \qquad (3)$$

In addition to the above transmission control, engine torque can also be simultaneously controlled via throttle, spark and fuel adjustments (or any combination thereof) in any well known fashion. For example, with an advanced indication of a planned upshift, the method and system of the present invention may use such preview control to lower (i.e., start closing) the throttle to timely reduce the engine torque during the inertia phase so that the resulting wheel torque is not significantly disturbed. Alternatively, the engine spark may be timely retarded and/or the engine fuel supply reduced for the same purpose. In that same regard, engine torque may also be controlled using known methods and systems directed to synthetic throttle and/or wheel torque estimation, such as that disclosed in the previously mentioned U.S. Pat. No. 5,452,207. Indeed, wheel torque better reflects the actual road load, especially during initial wheel spin.

Such control, in turn, can also lead to reduced requirements for the shift duration increase described above. In that regard, control of the engine via throttle, spark and/or fuel adjustments is undertaken to reduce engine speed ($N_e$), which reduces engine torque ($t_e$). Referring to equation (3) above, a reduction in engine torque ($t_e$) means that engine acceleration ($a_e$) may be higher. As previously stated, engine acceleration ($a_e$) is related to the slope of SR (26) through a torque conversion function. In that regard, if engine acceleration ($a_e$) may be higher, the slope of SR (26) may be steeper, thereby reducing the requirements for increasing the duration of the shift.

Figure 4:
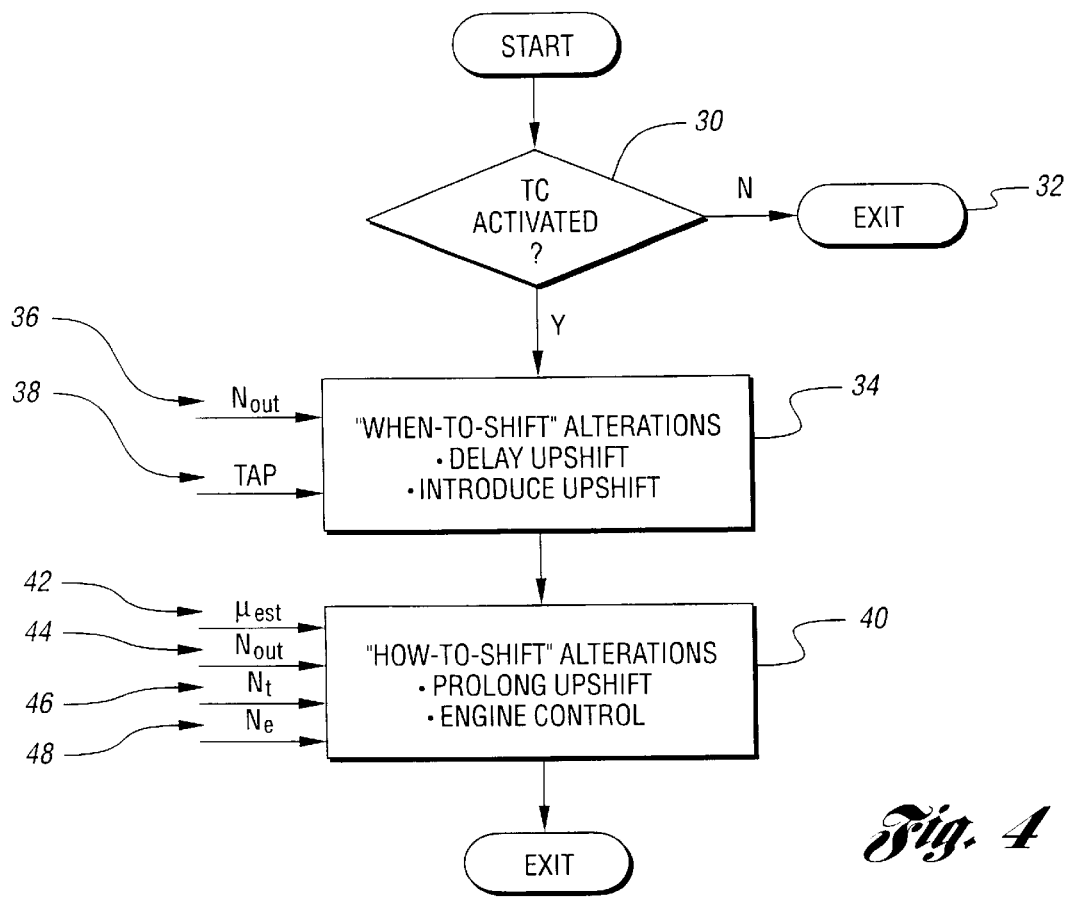
FIG. 4 is a simplified flowchart of the method of the present invention.

Referring next to FIG. 4, a simplified flowchart of the method of the present invention is shown. As seen therein, a determination is first made (30) as to whether the vehicle is operating in a traction control mode. If not, the method of the present invention is not performed (32).

However, if the vehicle is operating in a traction control mode, "when-to-shift" alterations are made (34) to the transmission control strategy. More specifically, the shift schedule of the transmission is first altered. As previously described, such an alteration of the shift schedule may include delaying a requested upshift until after driven wheel spin is first exhibited during traction control, or commanding an upshift after driven wheel spin is first exhibited during traction control. In either case, upshift is delayed or introduced after such wheel spin has been contained. In that regard, as also previously described, such alteration of the shift schedule is based on a number of inputs such as transmission output speed ($N_{out}$) (36), throttle angle position (TAP) (38), and wheel speed (not specifically shown).

In addition, "how-to-shift" alterations are also made (40) to the transmission control strategy. More specifically, as previously described, such alterations include prolonging an upshift based on an input of the estimated coefficient of friction of the driving surface ($\mu$A) (42). In that regard, as also previously described, such prolonging of an upshift is also based on a number of other inputs including transmission output speed ($N_{out}$) (44) and turbine speed ($N_t$) (46) (for use in determining speed ratio (SR) as well as engine acceleration ($a_e$)).

As also previously described, such "how-to-shift" alterations may also include decreasing engine torque delivered to the wheel during an upshift by retarding engine spark, reducing engine throttle and/or reducing engine fuel supply in any known fashion. In that regard, as described above, such engine torque control is based on a number of inputs including engine speed ($N_e$) (48) (in RPMs).

Figure 5:
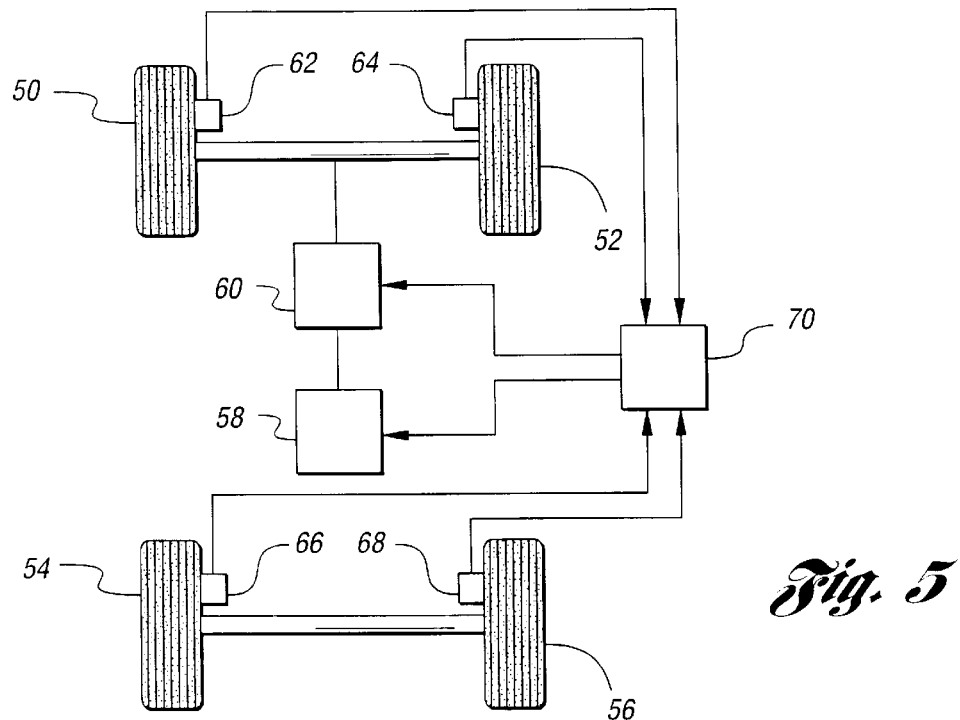
FIG. 5 is a simplified block diagram of the system of the present invention.

Referring finally to FIG. 5, a simplified block diagram of the system of the present invention is shown. As seen therein, the system is designed for use in a vehicle preferably having a pair of front driven wheels (50, 52), a pair of rear non-driven wheels (54, 56), and an engine (58) for driving front wheels (50, 52) via transmission (60).

In the preferred embodiment, the traction control system of the present invention comprises wheel speed sensors (62, 64, 66, 68) associated with each of the driven and non-driven wheel (50, 52, 54, 56). The system further comprises a controller (70) operatively connected to wheel speed sensors (62, 64, 66, 68), engine (58) and transmission (60). In that regard, controller (70) receives wheel speed input signals from wheel speed sensors (62, 64, 66, 68) and transmits control signals to engine (58) and transmission (60).

In the preferred embodiment, controller (70) is a conventional microprocessor appropriately programmed to perform various aspects of the method of the present invention. As is readily apparent to those of ordinary skill in the art, however, any equivalent thereof may also be used. It should also be noted that the aspects of the method of the present invention may be undertaken in any sequence and/or simultaneously.

The appropriately programmed controller (70) (or its equivalent) serve as control logic operative to estimate a driving surface coefficient of friction based on the sensed wheel speed, prolong a transmission upshift by reducing a rate of change of a commanded speed ratio in proportion to the estimated driving surface coefficient of friction, and decrease engine torque during the transmission upshift.

In that regard, as previously described, such control logic is operative to reduce the rate of change of the speed ratio according to the following constraint equation:

$$SR_{ng} * f_{tc}(SR_{tc},(t_e+I_e a_e)) * FDR/2 * e_{\mathit{eff}} < t_{lim}(\mu_{est}) \qquad (3)$$

where $SR_{ng}$ is the speed ratio of the next gear; $f_{tc}$ is a torque conversion function based on the speed ratio of the torque convertor $SR_{tc}$, engine torque $t_e$, engine inertia $I_e$, and engine acceleration $a_e$; FDR is the final drive ratio; $e_{\mathit{eff}}$ represents transmission efficiency and includes those factors lowering torque delivered at the wheel; and $t_{lim}(\mu_{est})$ is the limiting torque at a driven wheel as a function of the estimated driving surface coefficient of friction. Once again, $e_{\mathit{eff}}$ is less than one (approximately 0.9).

Still further, to prolong a transmission upshift, such control logic is operative to reduce a rate of application of fluid pressure to a transmission shifting element as previously described. Moreover, as described above, to decrease engine torque, such control logic is operative to retard an engine spark, reduce an engine throttle and/or reduce an engine fuel supply in any known fashion. Such control logic is still further operative, as also previously described, to identify a first driven wheel spin during the traction control event, and either delay the transmission upshift to a time after the first driven wheel spin, or introduce the transmission upshift after the first driven wheel spin.

As is readily apparent to those of ordinary skill in the art, then, the present invention provides an improved traction control method and system that reduces driven wheel speed transients related to transmission shifting during a traction control event. More specifically, the method and system of the present invention reduce such transients using coordinated engine and transmission control.

It is to be understood that the present invention has been described above in an illustrative manner and that the terminology which has been used is intended to be in the nature of words of description rather than of limitation. As previously stated, many modifications an variations of the present invention are possible in light of the above teachings. Therefore, it is also to be understood that, within the scope of the following claims, the invention may be practiced otherwise than as specifically described herein.

What is claimed is:

1. A coordinated engine and transmission traction control method for reducing driven wheel speed transients related to transmission shifting after a first occurrence of driven wheel spin, the method comprising:
   sensing a driven wheel speed;
   estimating a driving surface coefficient of friction based on the sensed driven wheel speed;
   reducing a rate of change of a transmission speed ratio in proportion to the estimated driving surface coefficient of friction to prolong a transmission upshift during an inertial phase of the transmission upshift; and
   decreasing engine torque during the transmission upshift.

2. The method of claim 1 wherein the rate of change of the speed ratio is reduced according to the constraint equation:

$$SR_{ng} * f_{tc}(SR_{tc},(t_e+I_e a_e)) * FDR/2 * e_{\mathit{eff}} < t_{lim}(\mu_{est})$$

where $SR_{ng}$ is the speed ratio of the next gear; $f_{tc}$ is a torque conversion function based on the speed ratio of the torque convertor $SR_{tc}$, engine torque $t_e$, engine inertia $I_e$, and engine acceleration $a_e$; FDR is the final drive ratio; $e_{\mathit{eff}}$ represents transmission efficiency and includes factors lowering torque at the wheel; and $t_{lim}(\mu_{est})$ is the limiting torque at a driven wheel as a function of the estimated driving surface coefficient of friction.

3. The method of claim 1 wherein reducing a rate of change of a transmission speed ratio includes reducing a rate of application of fluid pressure to a transmission shifting element.

4. The method of claim 1 wherein the transmission upshift is based on an estimated true vehicle speed.

5. The method of claim 1 wherein decreasing engine torque comprises retarding an engine spark.

6. The method of claim 1 wherein decreasing engine torque comprises reducing an engine throttle.

7. The method of claim 1 wherein decreasing engine torque comprises reducing an engine fuel supply.

8. The method of claim 1 further comprising delaying the transmission upshift to a time after the first occurrence of driven wheel spin has been reduced to a desired level.

9. The method of claim 1 further comprising introducing the transmission upshift after the first occurrence of driven wheel spin has been reduced to a desired level.

10. A coordinated engine and transmission traction control method for reducing driven wheel speed transients related to transmission shifting after a first occurrence of driven wheel spin, the method comprising:
    a wheel speed sensor for sensing a driven wheel speed; and
    control logic operative to estimate a driving surface coefficient of friction based on the sensed driven wheel speed, reduce a rate of change of a transmission speed ratio in proportion to the estimated driving surface coefficient of friction to prolong a transmission upshift during an inertial phase of the transmission upshift, and decrease engine torque during the transmission upshift.

11. The system of claim 10 wherein the control logic is operative to reduce the rate of change of the speed ratio according to the constraint equation:

$$SR_{ng} * f_{tc}(SR_{tc},(t_e+I_e a_e)) * FDR/2 * e_{\mathit{eff}} < t_{lim}(\mu_{est})$$

where $SR_{ng}$ is the speed ratio of the next gear; $f_{tc}$ is a torque conversion function based on the speed ratio of the torque convertor $SR_{tc}$, engine torque $t_e$, engine inertia $I_e$, and engine acceleration $a_e$; FDR is the final drive ratio; $e_{\mathit{eff}}$ represents transmission efficiency and includes factors lowering torque at the wheel; and $t_{lim}(\mu_{est})$ is the limiting torque at a driven wheel as a function of the estimated driving surface coefficient of friction.

12. The system of claim 10 wherein to reduce a rate of change of a transmission speed ratio, the control logic is operative to reduce a rate of application of fluid pressure to a transmission shifting element.

13. The system of claim 10 wherein, to decrease engine torque, the control logic is operative to retard an engine spark.

14. The system of claim 10 wherein, to decrease engine torque, the control logic is operative to reduce an engine throttle.

15. The system of claim 10 wherein, to decrease engine torque, the control logic is operative to reduce an engine fuel supply.

16. The system of claim 10 wherein the control logic is further operative to delay the transmission upshift to a time after the first occurrence of driven wheel spin has been reduced to a desired level.

17. The system of claim 10 wherein the control logic is further operative to introduce the transmission upshift after the first occurrence of driven wheel spin has been reduced to a desired level.

18. The system of claim 10 wherein the transmission upshift is based on an estimated true vehicle speed.

* * * * *